United States Patent
Chen

(10) Patent No.: US 7,276,822 B2
(45) Date of Patent: Oct. 2, 2007

(54) POWER ENGINE

(76) Inventor: Chuan-Sheng Chen, Fl. 12, No. 137, Sec. 4, JenAi Road, Taipei (TW)

( * ) Notice: Subject to any disclaimer, the term of this patent is extended or adjusted under 35 U.S.C. 154(b) by 123 days.

(21) Appl. No.: 11/213,681

(22) Filed: Aug. 30, 2005

(65) Prior Publication Data

US 2006/0267417 A1    Nov. 30, 2006

(30) Foreign Application Priority Data

May 30, 2005   (TW)  .............................. 94208896 U

(51) Int. Cl.
*H02K 35/00*    (2006.01)
(52) U.S. Cl. ...................................................... 310/15
(58) Field of Classification Search ............ 310/13–15, 310/24, 33–35
See application file for complete search history.

(56) References Cited

U.S. PATENT DOCUMENTS 3,676,719 A * 7/1972 Pecci ........................... 310/24
4,631,455 A * 12/1986 Taishoff ....................... 318/37
7,105,958 B1 * 9/2006 Elmaleh ....................... 310/24

* cited by examiner

*Primary Examiner*—Thanh Lam
(74) *Attorney, Agent, or Firm*—Leong C. Lei

(57) ABSTRACT

A power engine includes magnetic piston, electromagnetic winding, crankshaft, flywheel and voltage divider; the magnetic piston being adapted to a holder; a magnet being fixed to the piston; the winding being fixed to the holder; positive and negative currents being produced through the divider for the winding to attract and reject with that from the piston for the piston to engage in reciprocal motion for the crankshaft to output kinetics from the flywheel.

1 Claim, 3 Drawing Sheets

POWER ENGINE

BACKGROUND OF THE INVENTION (a) Technical Field of the Invention

The present invention is related to a power engine, and more particularly, to one that generates motive power by taking advantage of attraction and rejection forces of both positive and negative polarities of a magnet in a magnetic field produced by the conduction of windings to push the crankshaft to revolve without consumption of general fuel.

(b) Description of the Prior Art

Generally, the internal combustion engines of the prior art are classified into two types, gasoline engine and diesel engine that respectively consume gasoline or diesel as fuel. Electric spark or high pressure to rise the temperature ignites the mixture of fuel and air to produce explosion for driving multiple pistons to engage in reciprocal motion, thus to drive the crankshaft to revolve to generate motive power. The process of combustion of gasoline or diesel to generate motive power utilizes a cycle of four basic steps, respectively, air inlet, compression, explosion and exhaustion. It takes four elements, air, fuel, compression and ignition for the internal combustion engine to work. Air supplies oxygen need by the fuel to combust in the engine; compression turns the power generated from the combustion of the fuel into enough power; and ignition causes the mixture of air and fuel to combust. Absence of any of those four elements would fail the engine.

However, it is understood that the construction of the internal combustion engine is very complicated, prevents easy service, consumes primary energy source, and is vulnerable to pollute the environment.

SUMMARY OF THE INVENTION

The primary purpose of the present invention is to provide a power engine that eliminates those flaws of complicated construction, excessive consumption of energy source, environmental pollution found with the internal combustion engine of the prior art. To achieve the purpose, the present invention is comprised of magnetic piston, electromagnetic windings, crankshaft, flywheel, and voltage divider. Wherein, the magnetic piston has a magnet coupled in place to the body of the piston; output of trace voltage from a battery or any other power source is divided into positive and negative currents by means of the voltage divider for the electromagnetic windings to produce positive (N) and negative (S) polarities, which produce attraction and rejection with the positive (N) and the negative polarities from the magnetic piston for the magnetic piston to engage in reciprocal motion to further push and pull the crankshaft to revolve. Accordingly, kinetics from the revolving crankshaft is outputted through the flywheel adapted to the crankshaft. The construction of the present invention is innovative and would not rely on gasoline, diesel or any other fuel, thus is environment friendly. The revolutionary engine of the present invention is able to replace any internal combustion engine of the prior art to be applied in any automotive vehicle, and any other power driven mechanical equipment.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
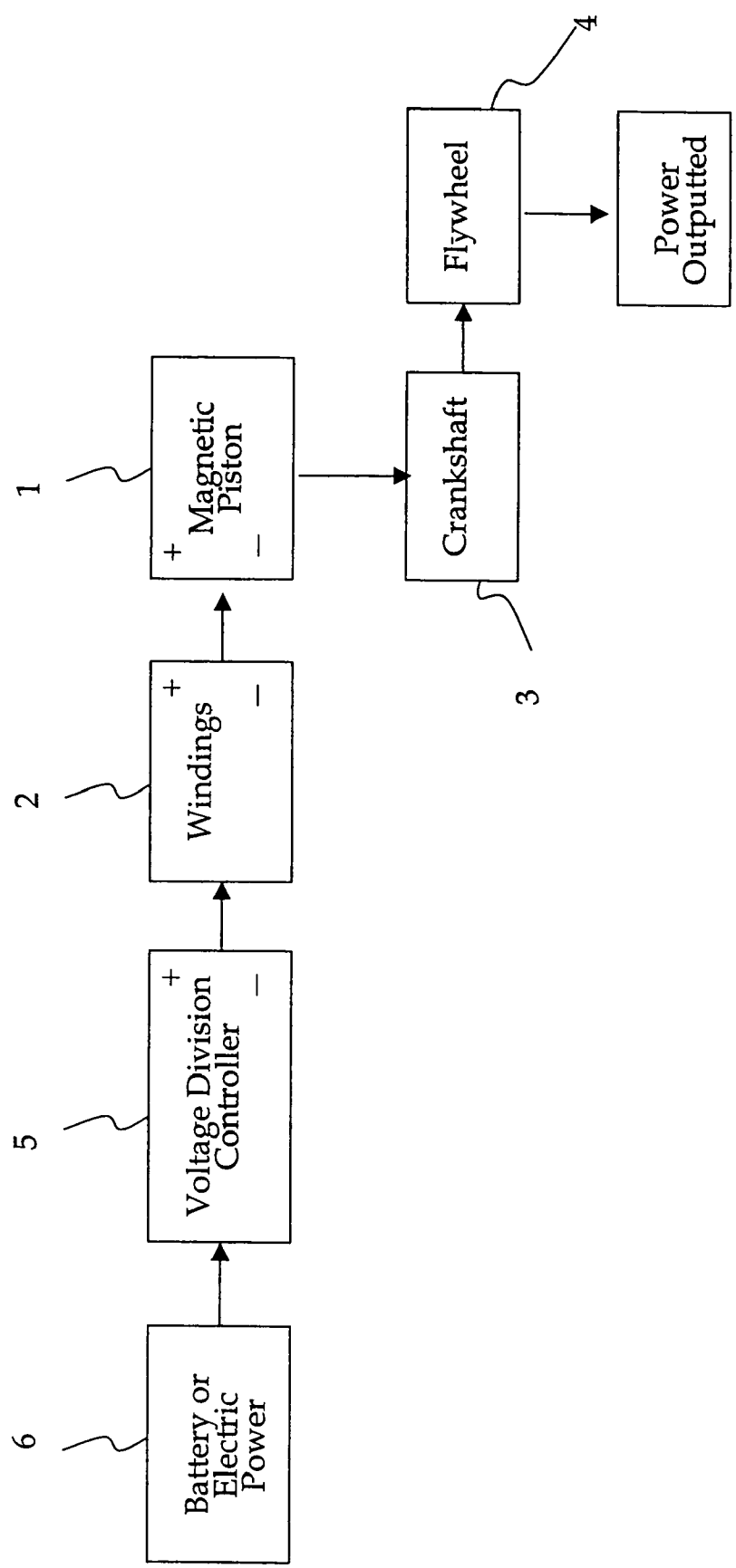
FIG. 1 is a flow chart of the present invention.
Figure 2:
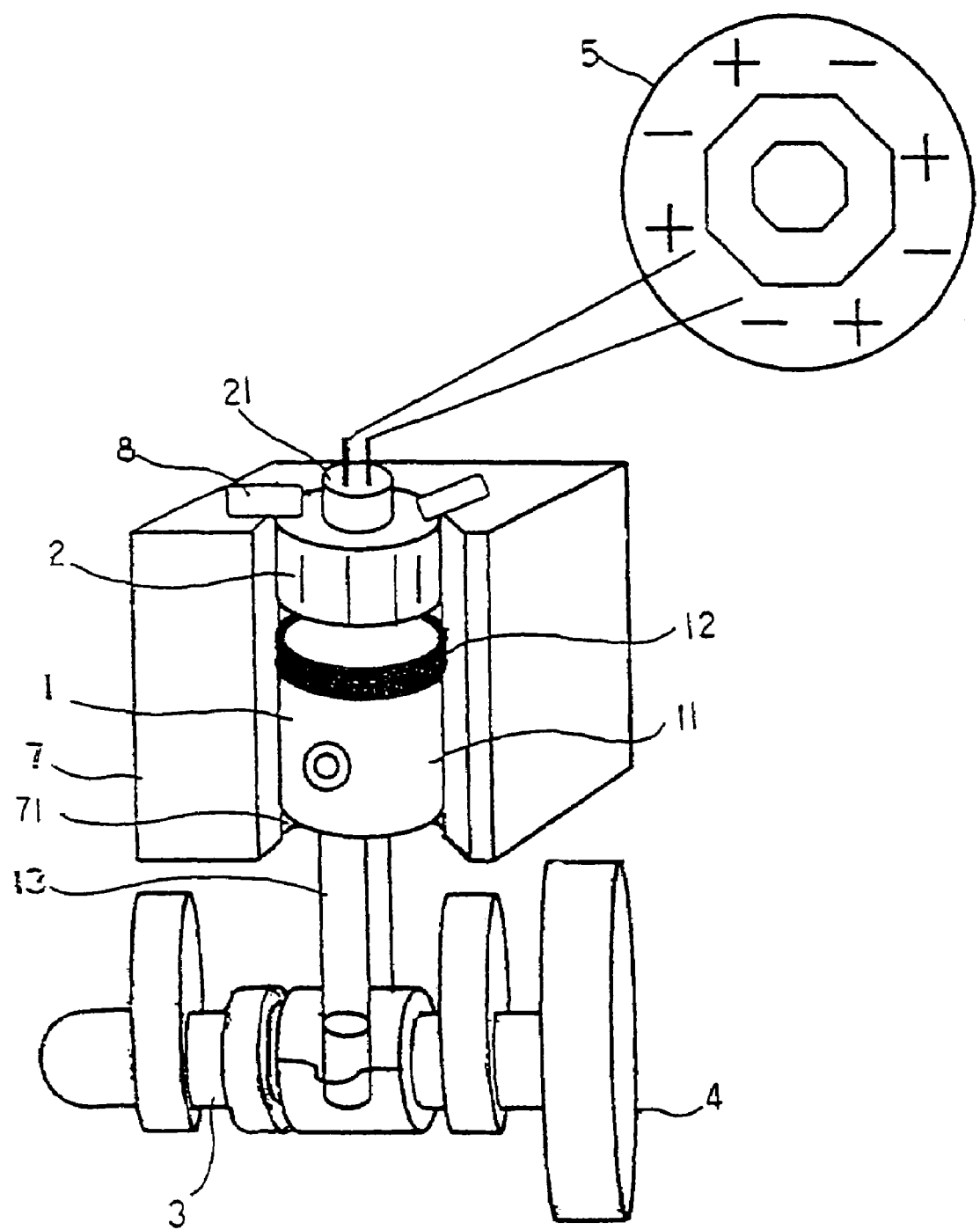
FIG. 2 is a perspective view of basic construction of a preferred embodiment of the present invention.
Figure 3:
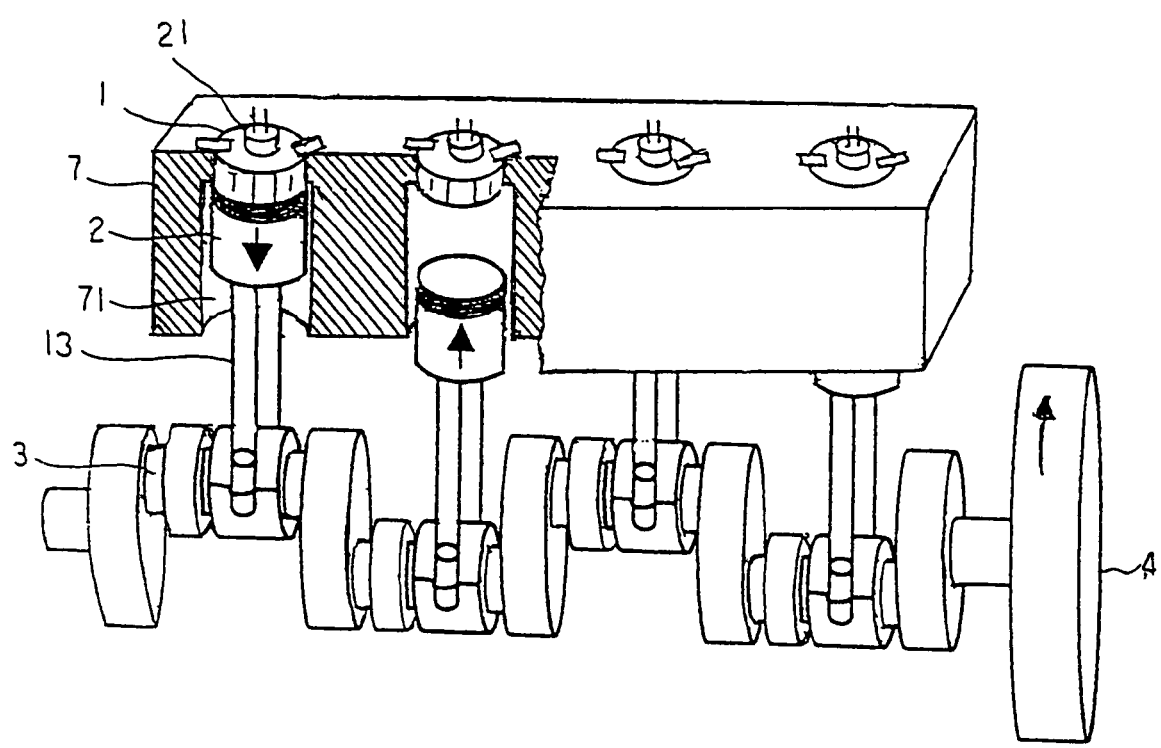
FIG. 3 is a perspective view of the preferred embodiment adapted with magnetic piston and electromagnetic winding.

Referring to FIGS. 1, 2 and 3, a power engine of the present invention is essentially comprised of a magnetic piston 1, an electromagnetic winding 2, a crankshaft 3, a flywheel 4 and a voltage divider 5. Wherein, the magnetic piston 1 is comprised of a magnet 12 fixed to the body 11 of the piston 1. Powered by a trace voltage from a battery or any other power source 6, the power engine in cycle distributes positive and negative currents by means of the voltage divider 5 to the electromagnetic winding 2, where in turn positive (N) and negative (S) polarities are created to produce attraction and rejection with the positive (N) and the negative (S) polarities of the magnetic piston 1; accordingly, the magnetic piston 1 executes reciprocal motion to push and pull the crankshaft 3 to revolve; and the revolving kinetics from the crankshaft 3 is outputted through the flywheel 4 adapted to the crankshaft 3.

In the preferred embodiment as illustrated in FIG. 2, the magnetic piston 1 is mounted inside a leading hole 71 of a holder 7. A connection rod 13 connected to the crankshaft 3 is fixed to the body 11 of the piston of the magnetic piston 1 while, the electromagnetic winding 2 is installed at the upper end of the leading hole 71 and secured in position by means of a locking pin 8. Both positive (N) and negative (S) polarities are created from the positive and negative currents divided by the voltage divider 5 are received by a receptor 21 of the electromagnetic winding 2 to produce attraction and rejection with the positive (N) and the negative (s) polarities from the magnetic piston 1 for the magnetic piston 1 to engage in reciprocal motion. The magnetic piston 1 pushes and pulls the crankshaft 3 to revolve through the connection rod 13 to output the revolving kinetics for application by means of the flywheel 4 adapted to the crankshaft 3.

Now referring to FIG. 3, the holder 7 may be made in a rectangular form as may be required, and multiple leading holes 71 are disposed to the holder 7 with each adapted with a corresponding electromagnetic winding 2 to constitute multiple units of the magnetic piston 1 to drive the crankshaft 3 to revolve for producing revolving kinetics with greater horsepower.

The power engine of the present invention operates on trace voltage output from battery or other power source to supply both of the positive and negative currents through the voltage divider in cycle and alternatively to the electromagnetic winding, which in turn produces positive (N) and negative (S) polarities to attract and reject those positive (N) and negative (S) polarities from the magnet for the magnetic piston to engage in reciprocal motion to push and pull the crankshaft to revolve; and finally, the revolving kinetics from the crankshaft is outputted through the flywheel adapted to the crankshaft. It takes only a trace voltage to drive the crankshaft to operate. In practice, multiple generators and batteries may be adapted t the power engine so that once the power engine is running, purposes of power generation and storage can be achieved at the same time. Therefore, the power engine is ever ready to be activated at any time without the risk of interruption. Furthermore, the present invention eliminates the use of the general fuel to make it easy to use without causing waste of energy or pollution to the environment while allowing it to be comprehensively applied in any automotive vehicle or mechanical equipment. As a revolutionary new type of power source, the present invention is innovative, gives significant industrial value. It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A power engine comprising:

a holder having a leading hole;

a magnetic piston mounted inside said leading hole of said holder, said magnetic piston including a body and a magnet fixed to said body;

an electromagnetic winding for generating positive and negative polarities to produce attraction and rejection with positive and negative polarities of said magnetic piston, said electromagnetic winding being installed at an upper end of said leading hole and secured in position by means of a locking pin;

a power source;

a voltage divider for distributing positive and negative currents;

a receptor for receiving said positive and negative currents;

a crankshaft;

a connection rod connecting said body of said magnetic piston to said crankshaft;

a flywheel mounted on said crankshaft; and a power source for supplying trace voltage which is divided by said voltage divider into positive and negative currents to said electromagnetic winding;

whereby said power engine operates on said trace voltage output from said power source to supply both positive and negative currents through said voltage divider in cycle and alternatively to said electromagnetic winding, which in turn produces positive and negative polarities to attract and reject positive and negative polarities of said magnet for said magnetic piston to engage in reciprocal motion to push and pull said crankshaft to revolve, and finally revolving kinetics from said crankshaft is output through said flywheel adapted to said crankshaft.

\* \* \* \* \*